April 7, 1925.
H. G. LAWRENCE
FLUSH VALVE
Filed Oct. 15, 1923
1,532,324
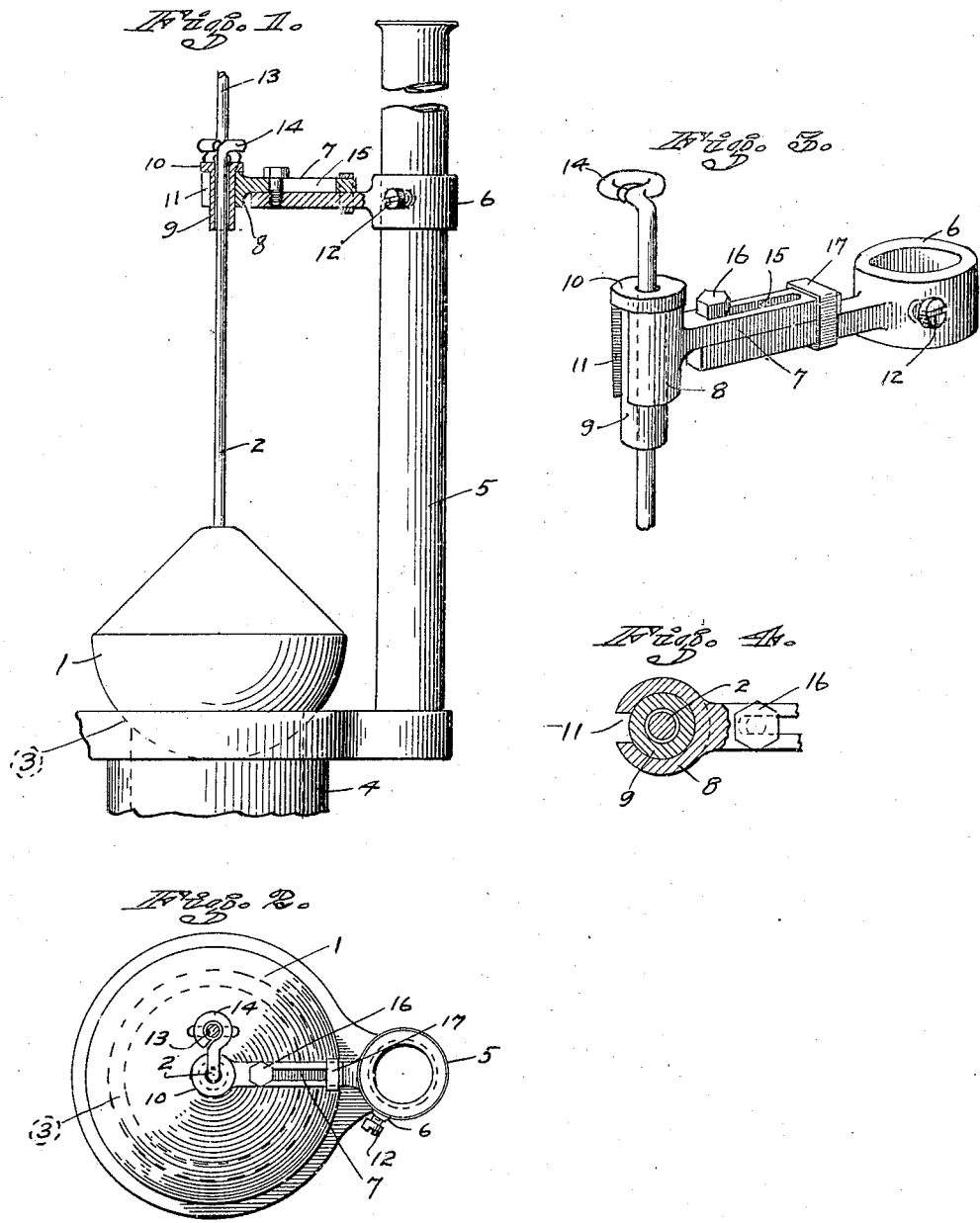
INVENTOR.
H. G. LAWRENCE
BY
ATTORNEYS.

Patented Apr. 7, 1925.

1,532,324

UNITED STATES PATENT OFFICE.

HARRY G. LAWRENCE, OF SALT LAKE CITY, UTAH.

FLUSH VALVE.

Application filed October 15, 1923. Serial No. 668,782.

*To all whom it may concern:*

Be it known that I, HARRY G. LAWRENCE, a citizen of the United States, and a resident of Salt Lake City, county of Salt Lake, State of Utah, have invented a new and useful Flush Valve, of which the following is a specification.

This invention relates to flush or tank valves principally as used in toilet flush tanks and has for its objects a valve of this type which is more easily adjusted for centralizing over the flush pipe valve seat and which is easily renewed when the rubber ball is out of shape without the present necessity of fussing around in the water in order to unscrew the ball from the stem.

My invention is illustrated in the accompanying drawings and in which:

Figure 1 is a side view of such a rubber ball valve in place on its valve seat and supported at the stem by a bracket from the overflow pipe.

Figure 2 is a plan view of Figure 1; and

Figure 3 is an enlarged perspective sketch of the adjustable bracket arm showing the upper part of the valve stem in place.

Figure 4 is a plan view of the end of the bracket arm with a portion shown in section to show the relation of the bracket, guide and stem.

In the figures (1) represents a common rubber ball tank valve, (2) the stem thereof, (3) the seat upon which the valve rests, and (4) the flush pipe.

The usual overflow pipe is shown at (5) and slidably arranged upon it is a bracket (6) having an adjustable arm (7) projecting laterally therefrom terminating in a slotted socket (8). Within the socket (8) is an easily fitting guide (9) through which loosely slides the stem (2) of the valve. The guide (9) has a shoulder (10) at the upper end to rest upon the socket and projects below the same as shown.

The slot (11) in the socket is large enough to pass the stem upon lifting the guide (9) out of the socket, and whereupon the ball and stem may be easily removed from the tank for replacing. The bracket is adjustable up and down along the overflow pipe, securing to it by means of the screw (12) and should be so adjusted that in the highest travel of the ball it will strike the guide (9) and lift it a trifle within the socket to prevent it " freezing " or corroding to the socket. The valve is of course lifted in the usual way by a pull connection (13) to its ring (14).

The arm of the bracket is preferably adjustable as clearly shown in Figure 3, having one portion slotted at (15) secured to the other part by a cap screw (16) and aligned by a strap (17), but the adjustable feature of the arm may be omitted if desired.

It will thus be seen that my improved flush valve provides for quick repair, for aligning over the valve seat, and for avoidance to corrosion trouble, a combination constituting an improvement which any plumber will instantly appreciate.

I claim:

1. In a device of the character described including a valve with a stem, means for guiding the stem for longitudinal sliding, a bracket supporting the guiding means and slotted for lateral passage of the stem upon removal of the guiding means from the bracket.

2. In a device of the character described including a valve with a stem, a guide for the stem, a socket in which said guide is positioned, said guide projecting below said socket and adapted for being struck by the valve in operating same for the purpose described.

HARRY G. LAWRENCE.